United States Patent [19]

Russell

[11] Patent Number: 5,454,040
[45] Date of Patent: Sep. 26, 1995

[54] DIGITAL CONTROL OF ANALOG SYSTEMS

[75] Inventor: David M. Russell, Newbury, England

[73] Assignee: Soundcraft Electronics Limited, Hertfordshire, England

[21] Appl. No.: 29,653

[22] Filed: Mar. 11, 1993

[30] Foreign Application Priority Data

Mar. 11, 1992 [GB] United Kingdom ............... 9205291

[51] Int. Cl.$^6$ .................................................. H04L 9/00
[52] U.S. Cl. ............................ 380/49; 380/9; 380/46; 331/78; 364/717; 359/142; 359/145
[58] Field of Search .................................. 380/9, 19, 28, 380/46, 48, 49; 331/78; 364/717; 359/142–148

[56] References Cited

U.S. PATENT DOCUMENTS

| 4,091,272 | 5/1978 | Richter et al. ...................... 359/148 |
| 4,304,962 | 12/1981 | Fracassi et al. ...................... 380/42 |
| 4,663,501 | 5/1987 | Pospischil ........................... 380/48 |
| 4,908,860 | 3/1990 | Caprarese et al. ................... 380/19 |
| 5,029,210 | 7/1991 | Gruenberg ........................... 380/46 |
| 5,054,067 | 10/1991 | Moroney et al. .................. 380/9 X |
| 5,191,614 | 3/1993 | LeCong ............................... 380/49 |
| 5,331,450 | 7/1994 | Heep et al. ....................... 359/146 X |

FOREIGN PATENT DOCUMENTS

| 0298609 | 1/1989 | European Pat. Off. ......... H04L/25/49 |
| 1363451 | 8/1974 | United Kingdom ........... H04L/27/00 |
| 2104755 | 3/1983 | United Kingdom ............. H04L/7/08 |
| 2194712 | 3/1988 | United Kingdom ............. H04L/9/04 |
| WO85/042998 | 8/1985 | WIPO ............................... H04J/1/05 |

OTHER PUBLICATIONS

E. Kranakis, *Primality and Cryptography*, (John Wiley & Sons, 1986), Section 4.1, pp. 98–99.

Primary Examiner—Bernarr E. Gregory
Attorney, Agent, or Firm—Nixon & Vanderhye

[57] ABSTRACT

An audio mixing console incorporates a number of audio modules connected in series, with the first module being serially connected to a digital controller. The digital controller provides digital signals to the audio modules, the digital signals comprising both clock signals and data. Data is sent by the controller to each audio module by way of a data coder which randomizes or scrambles the data stream such that it is not cyclic or repetitive. The coding circuit may be a maximal length pseudo number sequence generator, and this enables decoding to be made by a complementary decoding circuit without links between coder and decoder being required. As the data output appears completely random, it has no fundamental frequency and consequently there is no interference from crosstalk.

19 Claims, 8 Drawing Sheets

DIGITAL CONTROL OF ANALOG SYSTEMS

BACKGROUND TO THE INVENTION

The present invention relates to methods of controlling analog systems digitally, and to analog systems incorporating digital control means.

Digital techniques are becoming increasingly sophisticated, and increasing it is required to control analog systems by digital circuits. However, difficulties have been encountered in employing digital control techniques for audio analog systems. This is particularly the case for audio mixing consoles, which are particularly susceptible to all forms of noise because of their wide dynamic range and their use of virtual earth bus topology.

Conventionally, attempts to use standard digital control techniques, such as memory mapped latches and DA converters, or serially loaded shift registers, to control an audio console, have failed because various tones and whistles have appeared on the audio output. In this respect, dynamic digital signals contain high frequency harmonics and if the fundamental frequency, or any of its harmonics, is within the audio band, they will be directly audible. Furthermore, even if the digital signals are arranged such that all harmonics are outside of the audio band, intermodulation can generate spurious tones within the audio band.

In some cases it is possible to avoid the worst interference effects by shielding such that there is no coupling between digital lines and audio circuits, but this is an expensive solution which is never totally successful. Furthermore, the ear will readily detect a single coherent tone against background white noise, even if the white noise is at a much higher level than the tone itself. The applicants have found that a zone must be at least 20 dB lower than the white noise before it becomes imperceptible.

SUMMARY OF THE INVENTION

According to a first aspect of the present invention there is provided a method of controlling an analog system utilising digital control means, the method comprising the steps of coding digital signals, transmitting the coded digital signals to at least one component of said analog system to be controlled, and at the or each said component receiving and decoding the coded digital signals, wherein the analog system to be controlled is an audio system, and wherein the step of coding the digital signals comprises randomizing or scrambling said digital signals such that they are not cyclic or repetitive.

Because the coded digital signals are not cyclic or repetitive, noise coupled to the or each said component from the digital signals appears as white noise. No tones or whistles as Generally occur when audio systems are controlled digitally appear on the output of the audio system. In this respect, noise emanating from the digital signals has not been eliminated but has been concealed or disguised as white noise.

In a preferred embodiment, the audio system comprises a number of audio components connected serially to form a serial loop, and said method comprises the step of transmitting coded digital signals undirectionally around the serial loop.

Preferably, one said audio component of the audio system is arranged to receive and decode transmitted coded digital signals, and said one component is further arranged to encode the digital signals and transmit said coded digital signals to a succeeding audio component.

In a preferred embodiment, the step of coding the digital signals comprises generating a pseudo random bit sequence from said digital signals.

Preferably, the step of decoding the coded digital signals comprises using a technique complementary to the coding technique.

In an embodiment, digital signals are coded by logically combining the digital signals with the output of a random number generator to provide the pseudo random bit sequence. In such circumstances, the coded digital signals are subsequently decoded by logical combination with the same pseudo random bit sequence.

It is possible to use the output from a single random number generator to provide the pseudo random bit sequence for both encoding and decoding. Alternatively, similar random number generators may be provided for both coding and decoding, the coding and decoding generators being synchronously clocked. However, in a preferred embodiment, a maximal length random number generator is arranged for coding, and a complementary maximal length random number generator is used for the decoding.

Preferably, the digital signals are a series of data bits.

When controlling an audio circuit by digital means, regular clock signals are generally employed, and these can also produce audible tones. In this respect, although the frequency of the clock signal would normally be outside the audio range, heterodyning or other intermodulation with other signals can produce in-band tones. For example, the clock signals may mix with the high frequency of a cassette recorder.

Accordingly, in an embodiment, the clock signal utilised in an analog system is a series of pulses arranged to have a random mark-space ratio.

Because the clock signal is a series of pulses with a random mark-space ratio, it does not have a cyclical component and if coupled into the audio component it appears as white noise. As in the case of the randomized digital signals, the randomized clock signal conceals or disguises tones by converting them into white noise.

The invention also extends to an analog system incorporating digital control means, said analog system comprising at least one audio component, digital control means for generating digital signals for controlling said audio component, and coupling means coupling said digital control means to said audio component for transmitting said digital signals to said audio component, wherein coding means are provided for coding the digital signals for transmission to said audio component, wherein said audio component comprises decoding means for decoding coded digital signals received, and wherein said coding means are arranged to randomize or scramble said digital signals such that said coded digital signals are not cyclic or repetitive.

In a preferred embodiment, said digital control means comprises a controller which comprises or is coupled to processing means, for example, a microprocessor.

In a preferred embodiment, the control means is serially coupled to the one or a first one of said audio components. Preferably, the audio system is a modular system formed of a plurality of serially coupled audio components, the first one of which is coupled to said digital control means, and a last one of which is also connected to said control means to define a serial loop.

Preferably, each said audio component comprises a decoder for receiving coded digital signals from the control means or a preceding audio component, and preferably each said audio component comprises a coder for coding digital signals and transmitting them to a succeeding audio component or said control means.

The decoder of each said audio component is coupled by coupling means to a preceding audio component or to the control means, and the coder of each said audio component is coupled to a succeeding audio component or to the control means.

In a preferred embodiment, the coupling means for coupling each said coder or decoder is provided by a bus. Preferably, the bus is arranged so that the output of one audio component is not directly connected to the output of a preceding or succeeding audio component.

In a preferred embodiment, the bus is arranged to define a ring network and is coupled to each audio component by way of substantially identical connectors, and wherein an open circuit is connected to an output pin of each said connector, the open circuit being connected to different output pins of adjacent connectors.

In a preferred embodiment the bus is defined by a single ribbon cable.

In a preferred embodiment, one of the pins of the connector coupled to each audio component is dedicated as an input port, and another of the pins of said connector is dedicated as an output port, and wherein the connectors of adjacent components have different ones of their connector pins dedicated as input and output ports.

According to a further aspect of the present invention there is provided an audio component of an audio system, said audio component being arranged to produce an audio output in response to coded digital signals received, wherein said audio component comprises a decoder for receiving and decoding digital signals, sound producing circuits responsive to said decoded digital signals, and coding means for coding said digital signals and applying said coded digital signals to an output of the audio component.

Preferably, the coder of the or each said audio component comprises means for logically combining the digital signals with a pseudo random bit sequence. In this case, the decoder of the or each said audio component comprises means for logically combining the coded digital signals with a complementary pseudo random bit sequence.

In an embodiment, each pseudo random bit sequence is generated by a pseudo random number generator.

For example, each pseudo random number generator may comprise a clocked shift register with a feedback circuit and a tapped output. Preferably, the pseudo random number generator is arranged to operate as a maximal length sequencer.

The control means of said analog system may also be provided with a coder for coding digital signals, and a decoder for decoding digital signals. Preferably, the coder and decoder of the analog system are configured as defined above.

In a preferred embodiment, the digital signals are a sequence of data bits.

In preferred embodiments of the inventions defined above, the or each audio component and the controller therefor are arranged to form an audio console.

In a preferred embodiment of the audio console, the controller is isolated and/or appropriately screened from the or each audio component.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

Because of the power and accuracy of digital techniques, it is required to use digital control for analog systems. However, where the analog system to be controlled is, or incorporates, audio modules or components, the digital signals inevitably produce tones and whistles on the audio output which are quite unacceptable. In this respect, the signals produced by digital circuits are generally pulsed waveforms with fast rise and fall times. Such signals are rich in harmonics up to frequencies as high as several hundred megahertz. The sharper the transitions of the pulse waveform, the higher in frequency the harmonics extend. Furthermore, as the mark-space ratio increases, the energy becomes shifted to higher harmonics.

If the fundamental frequency of a digital signal is within the audio band it may be directly audible at the audible output. Furthermore, there may be intermodulation effects between any one of the harmonics of the digital signal and any other radio frequency component present. This intermodulation can produce significant interference in the audio band.

The unwanted signals from the digital controller can be coupled into the analog system by crosstalk, that is, by capacitive or inductive coupling, by electromagnetic radiation coupling, or by the existence of common impedance paths. Clearly, such coupling can be minimised by careful positioning of the digital lines relative to the audio circuits, by screening, and by the provision of isolation circuits and the like. However, such techniques require manufacture to high tolerances, and there is a limit to the topology and constructional techniques which can be employed at a reasonable cost.

Even when the circuits have been subjected to the most rigorous constructional techniques to avoid coupling there are still problems. In this respect, the digital signals generate single coherent tones, and the human ear readily detects such coherent tones, even amongst a background of white noise which is at a much higher level than the tones themselves. The applicants have determined that a tone must be 20 dB lower than the surrounding noise before it becomes imperceptible.

As it is difficult and costly to eliminate or suppress all of the tones, in the present invention the applicants propose to disguise the control waveforms rather than to try to eliminate them. In this respect, the digital control signals are arranged to appear as white noise which is rendered indistinguishable from the white noise generated by the analog circuitry.

Figure 1:
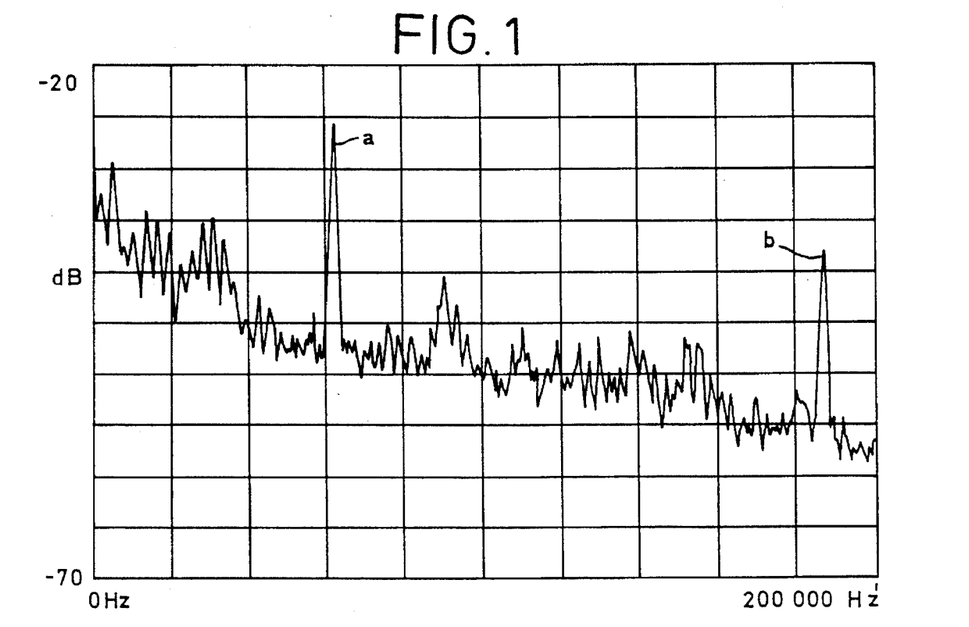
FIG. 1 shows a spectrum measured on a spectrum analyzer of the background noise from an audio console controlled by digital signals over the frequency range 0 Hz to 200 KHz.

FIGS. 1 to 6 illustrate graphically the problems and the solution now proposed by the applicants. FIG. 1 shows a frequency spectrum, measured by a spectrum analyzer, developed by an audio mixing console which is controlled by a digital controller. In this respect, the digital controller incorporates a clock running at 62.5 KHz. Each channel of the audio mixing console was arranged to receive data bit packets of 22 bits in an associated shift register, and each channel is provided with a mute circuit and a level control circuit which was activated.

FIG. 1 shows the noise generated in the audio console, and the large spike $a$ generated by the 62.5 KHz clock is clearly visible. It will also be seen that there is also a spike $b$ which is the third harmonic of the clock signal. Intermodulation of these spikes with other interfering signals causes objectionable audio tones.

Figure 2:
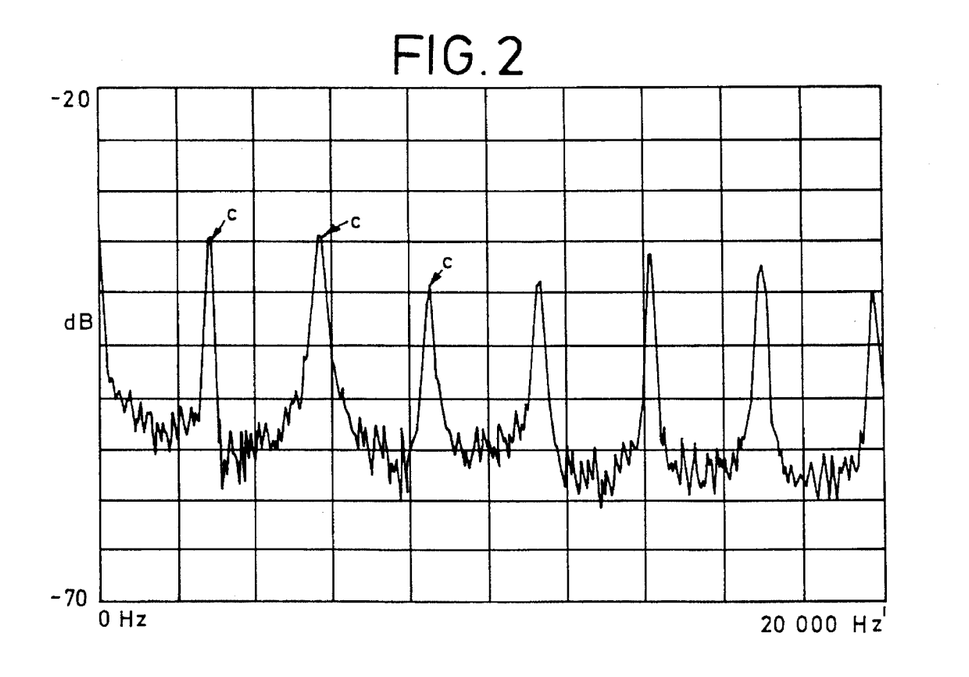
FIG. 2 shows an expanded part of the spectrum of FIG. 1 over the frequency range 0 Hz to 20 KHz.

FIG. 2 shows a spectrum similar to that of FIG. 1 but over the frequency range 0 Hz to 20 KHz only. In FIG. 2 a series of spikes $c$ are clearly visible. It will be appreciated that because the data packet for each 22 bit channel is identical, a 22 bit data pattern repeats itself. The digital control signals therefore produce a frequency component at 62.5 KHz/22 that is at 2.8 KHz, and it will be immediately be appreciated that the spikes $c$ are at 2.8 KHz and at its harmonics. Clearly, these spikes $c$ are produced by the repetitive data pattern. The spikes $c$ as the spikes $a$ and $b$, generate most objectionable tones at the audio output of the mixing console.

As will be described in more detail below, the present invention disguises the effects of the digital signals by making the effects appear as white noise. This is done by randomizing or scrambling the digital signals such that these are not cyclic or repetitive and therefore do not exhibit a fundamental frequency.

Figure 3:
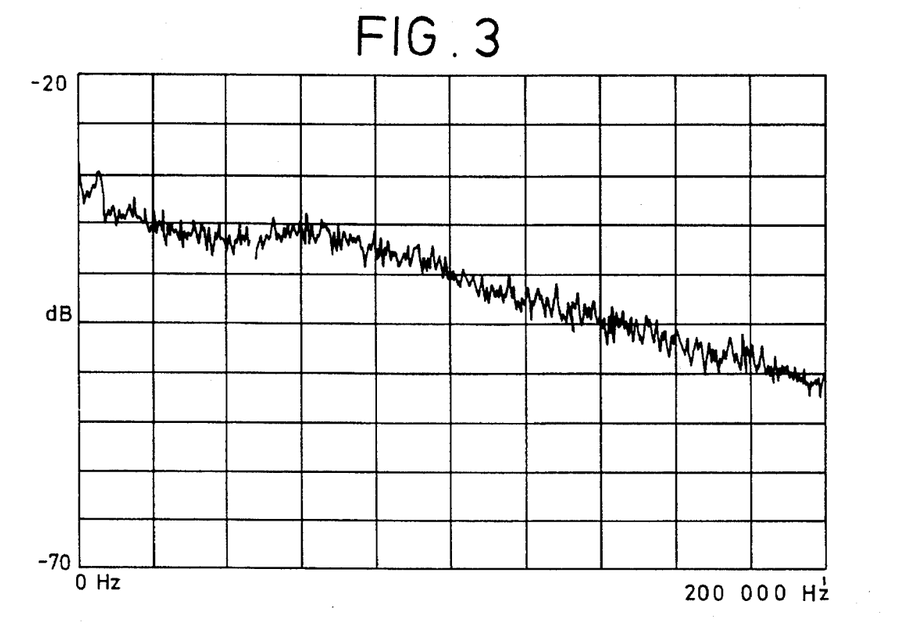
FIG. 3 shows a spectrum taken over the same range as FIG. 1 but showing the effect of randomized clock pulses on the audio console.
Figure 4:
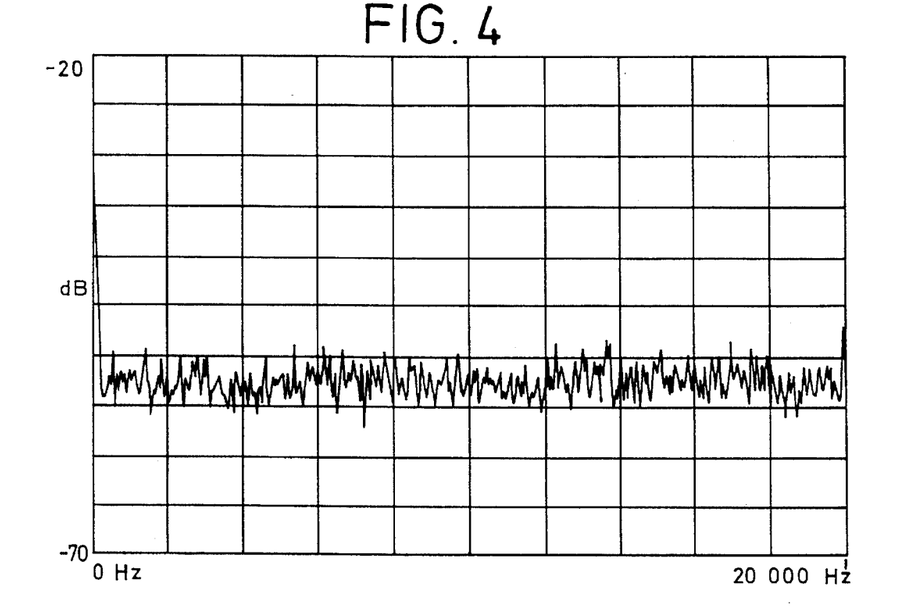
FIG. 4 shows a spectrum taken over the same range as FIG. 2 but showing the effect of randomized data signals on the audio console.

FIG. 3 is a plot similar to that of FIG. 1 but taken after the 62.5 KHz clock had been randomized. It will be seen from FIG. 3 that in this situation the spikes $a$ and $b$ of FIG. 1 have been completely removed, at the expense of a raised noise floor. Similarly, FIG. 4 shows a plot similar to that of FIG. 2 taken after the data pattern has been randomized. Again, the spikes $c$ have disappeared and the noise floor as compared to that of FIG. 2 has been raised.

Figure 5:
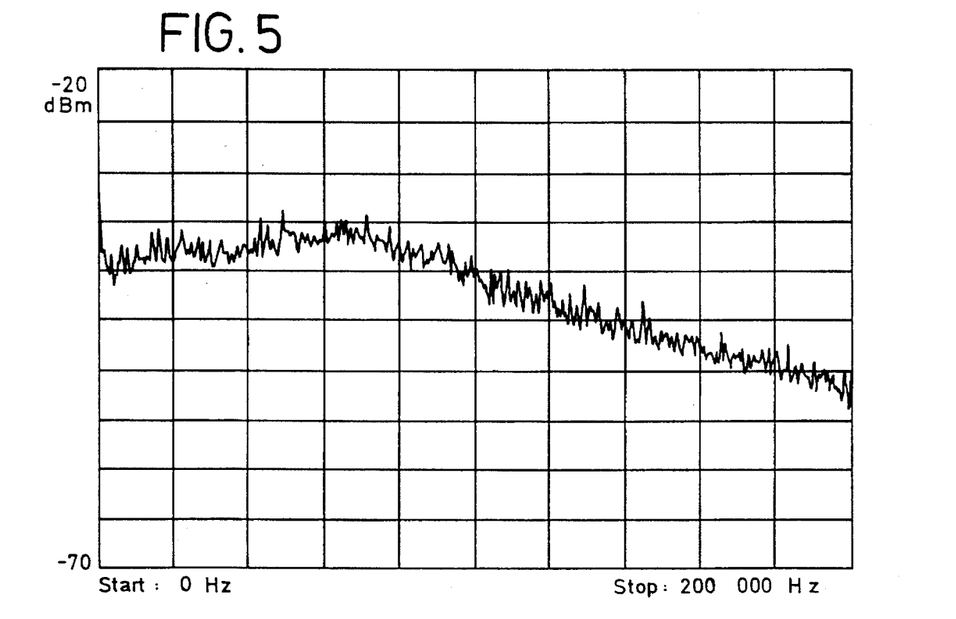
FIG. 5 shows a spectrum taken over the same range as FIG. 1 but with both the clock signals and the data bit signals randomized.
Figure 6:
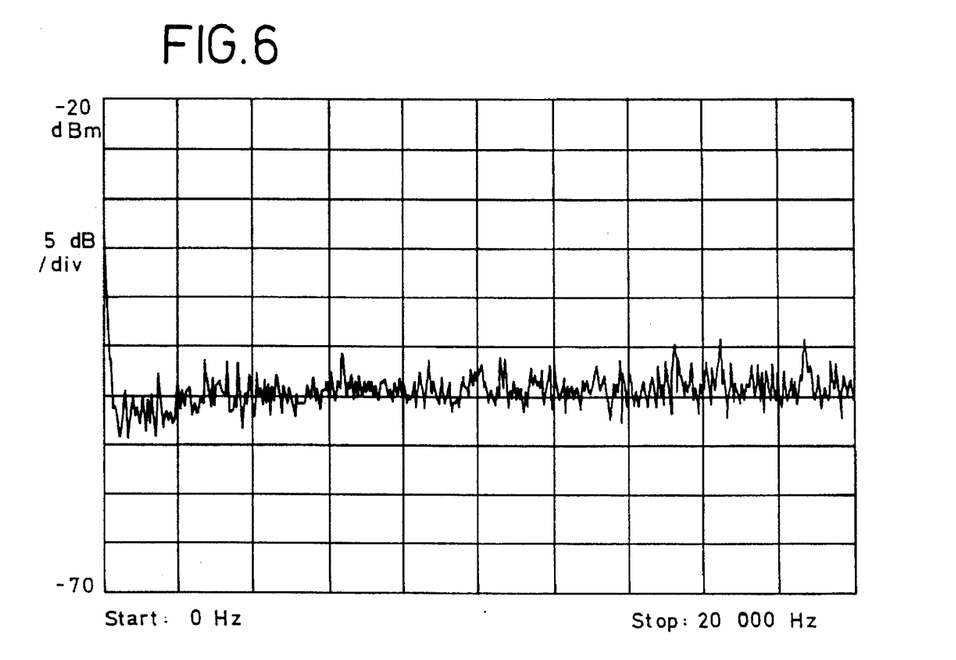
FIG. 6 shows a spectrum taken over the same range as that of FIG. 2 but with both the clock signals and the data bit signals randomized.

FIGS. 5 and 6 show the results obtained when randomization both of the clock signal and of the data signals is performed. In this respect, FIG. 5 is taken over the same frequency range as FIGS. 1 and 3, whereas FIG. 6 is taken over the same range as FIGS. 2 and 4. It will be appreciated that when both the clock signals and the data bit signals are randomized simultaneously, the frequency spectra as shown in FIGS. 5 and 6 are substantially clear of all single tones. It will be appreciated that the noise produced utilising these techniques is thus completely white and therefore unobjectionable.

Figure 7:
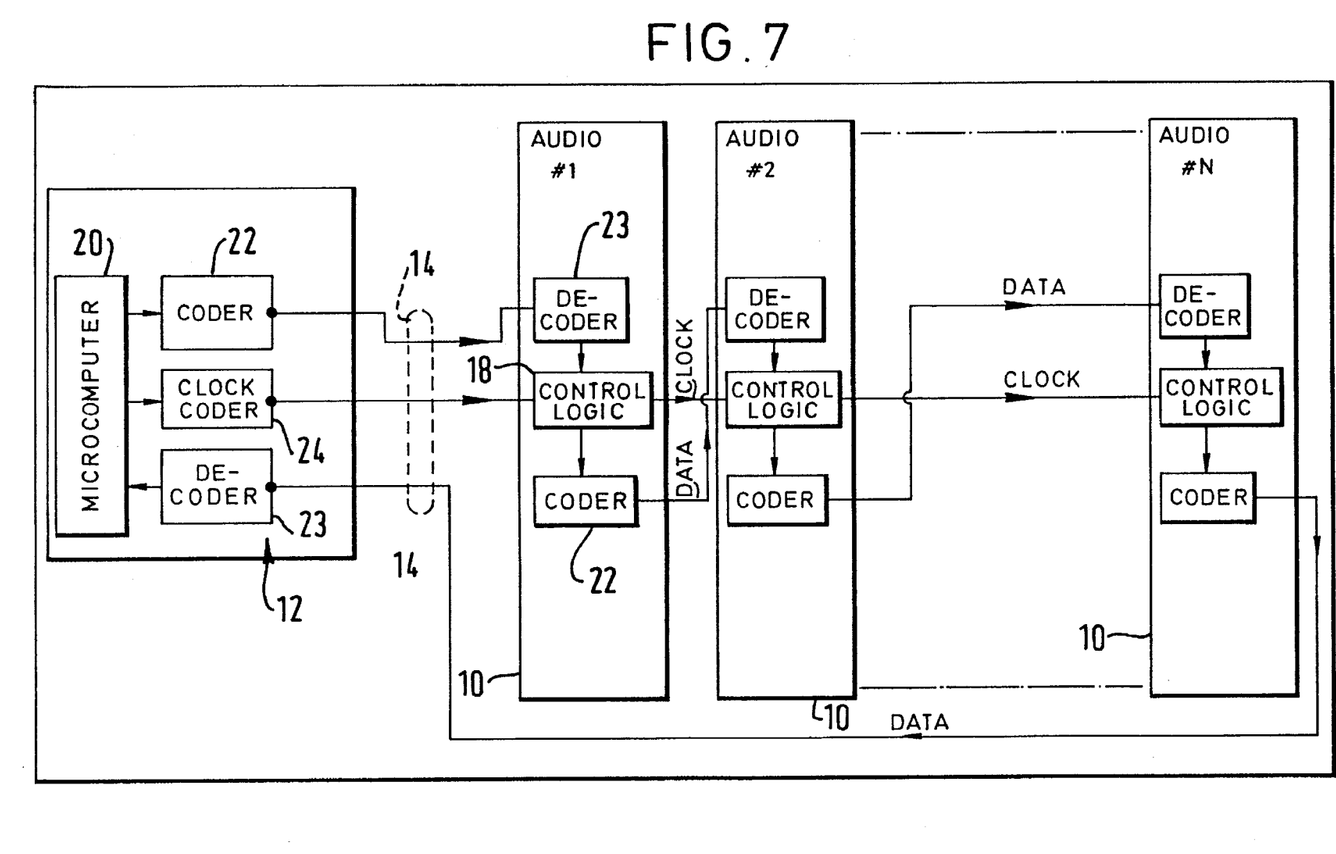
FIG. 7 shows schematically an analog system of the invention incorporating digital control means.

FIG. 7 shows schematically an audio mixing console controlled by digital control means in accordance with the present invention. The audio mixing console incorporates N audio components or modules 10, each generally providing one channel of the console. The components and functions of each audio module 10 may be chosen as required. However, each said audio module 10 will generally comprise at least one shift register to receive digital data and fader circuits controlled by the or each shift register. The faders will be arranged to adjust controllable audio amplifiers by way of appropriate digital to analog conversion circuits.

In the embodiment illustrated, each audio module 10 is connected in series to the other audio modules 10, with the first module 10 being serially connected to a digital control circuit or controller 12, and the last module 10 being similarly connected to the digital controller 12. The arrangement is such as to provide a serial loop, and the logic of the controller and/or of the modules is arranged such that data passes around the serial loop in one direction only, that is, so that the serial loop is unidirectional.

The structure and functions of the digital controller 12 may be determined as convenient. As will be described below, the controller 12 is arranged to provide digital signals to the audio modules 10, the digital signals comprising both clock signals and data. The digital controller 12 may include processing means, for example, a microprocessor 20, to generate the data, and/or may be connected to receive the data from external means. However, because the controller 12 is a digital circuit, it is physically isolated in the console from the audio modules 10.

In the embodiment illustrated, the controller 12 comprises a data coding circuit 22 which is arranged to randomize data and transmit it to the audio modules 10. In this respect, each audio module 10 is provided with a respective data decoder 23. The controller 12 is also provided with a clock coder 24 which is arranged to randomize or scramble clock signals which are fed to the audio modules 10. The controller 12 also comprises a data decoder 23 which is substantially identical in construction to the decoders 23 of the audio modules 10.

Figure 8:
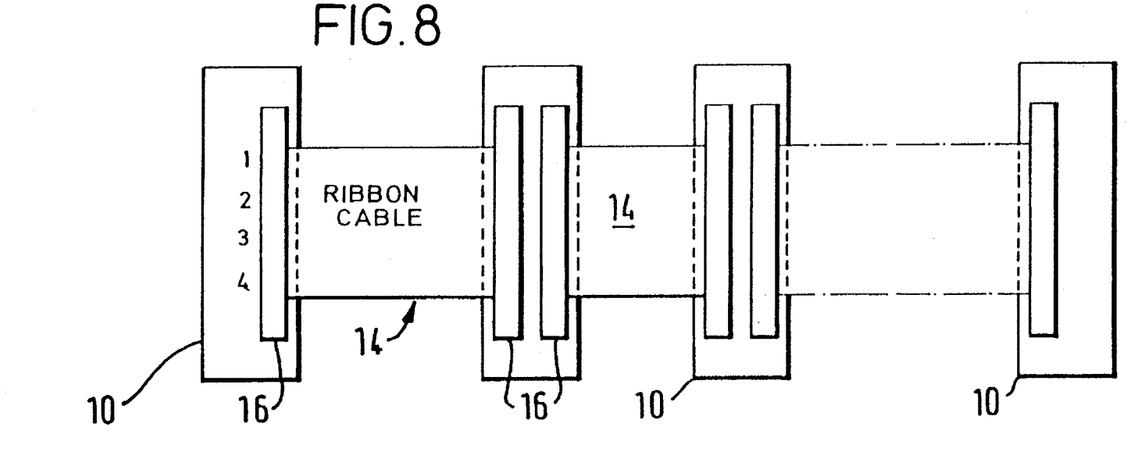
FIG. 8 shows a method of connecting audio modules of the analog system of FIG. 7 to each other and to a controller to form a serial loop.

As is shown in FIG. 8, the serial loop is physically provided by way of a ribbon cable 14 which interconnects a connector 16 of the controller 12 and substantially identical connectors 16 of the audio modules 10. To form the serial loop, each audio module 10 is provided with two identical connectors 16. In the embodiment illustrated in FIG. 8, the first pin of each connector 16 is arranged to carry the ground, the third pin of each connector 16 is arranged to carry send data from the controller 12, whilst the fourth pin carries return data to the controller 12. The coded clock signal from the clock coder 4 of the controller 12 is applied to the second pin of each connector 16 by way of the ribbon cable 14.

It will be immediately apparent from FIG. 7 that as well as having a data decoder 23 for the data, each audio module 10 also has a data coder 22. The data coder 22 of each module 10 is substantially identical to the data coder 22 of the controller 12. Thus, at each audio module 10 the data received is decoded for use by that module, and is also encoded for transmission to the next module. This means that the data is always transmitted in its coded, randomized form, and also that the data is only decoded directly at its point of use. This reduces considerably the opportunity for crosstalk or any interference from the uncoded data.

It will also be appreciated that the coded clock signals from the clock coder 24 of the controller 12 are applied to control logic 18 of each audio module 10 for control of that module. Furthermore, the control logic 18 of one audio module 10 passes on the coded clock signal to the next audio module 10. As the clock signals are transmitted through the console in randomized form, the opportunity for interference or intermodulation is considerably reduced.

Figure 9:
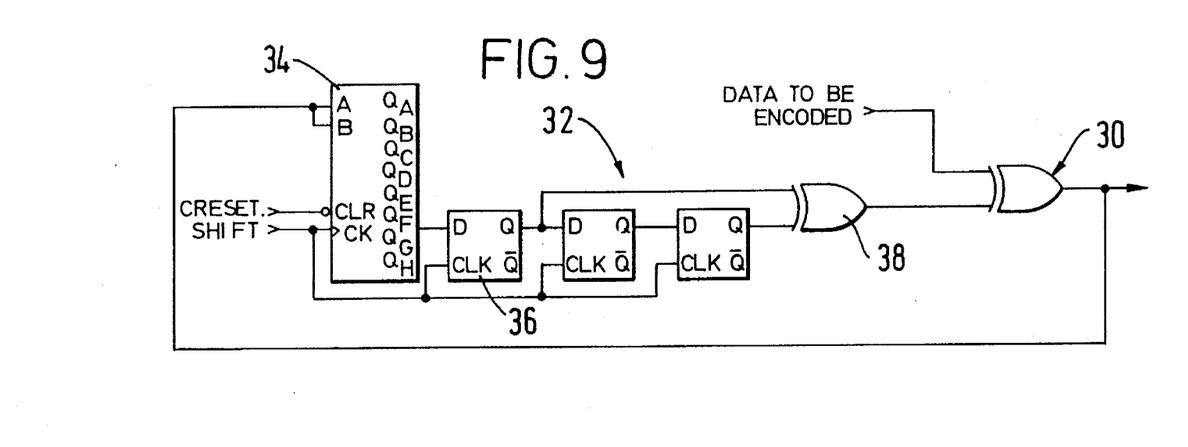
FIG. 9 shows a coding circuit provided in the controller and in each audio module of the analog system for randomizing or scrambling data signals.

The data to be sent to each audio module 10 from the controller 12 would, in the absence of the data coder 22, be a regular stream of data bits. However, because, and as discussed above, a regular stream of bits produces noise interference, the data stream is randomized or scrambled such that it is not cyclic or repetitive. FIG. 9 shows an example of an encoder circuit which may be used to comprise the coder circuit 22 of both the controller 12 and of the audio modules 10. In the encoder of FIG. 9, the data to be randomized is fed, by way of an exclusive OR gate 30 through a maximal length pseudo random bit sequence generator, shown generally at 32. This pseudo random bit generator comprises, in known manner, a clocked shift register to which feedback is applied and which is tapped. In the circuit shown in FIG. 9, the clocked shift register comprises a register 34 whose effective length is increased by the provision of a number of clocked bistables 36. The output of the circuit is fed back to the input of the shift register 34. The output of the effective shift register and a tapped output thereof are fed to inputs of a further exclusive OR gate 38. The output of gate 38 is a pseudo random number sequence which is applied to one input of the exclusive OR gate 30 whilst the data to be encoded is fed to its other input. The output of the exclusive OR gate 30 is the encoded data output.

The operation of the coding circuit shown in FIG. 9 will not be described in further detail herein. However, it is important to note that a maximal length pseudo number sequence generator should be used. Thus, the full set of random numbers repeated in a pattern should be utilised, rather than a subset of those numbers. This enables decoding to be made by a complementary circuit without links between coder and decoder being required.

It will be appreciated that as the data output appears completely random, it has no fundamental frequency and consequently there is no interference from crosstalk.

Figure 10:
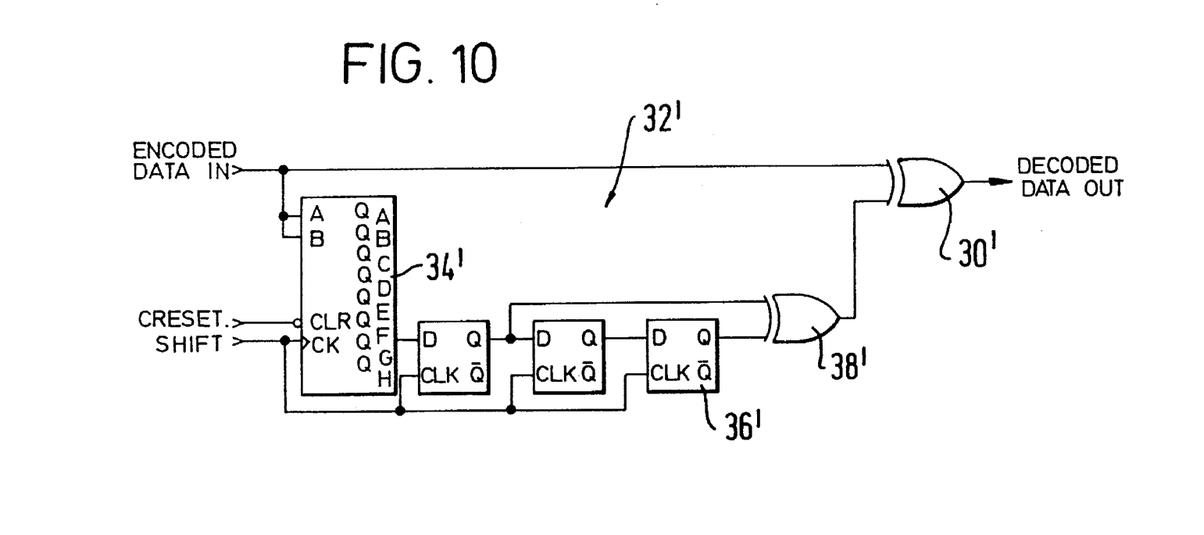
FIG. 10 shows a decoding circuit for decoding the data coded by the coding circuit of FIG. 9.

At each audio module 10 (FIG. 9) the encoded data from a coding circuit 22 is received by the respective decoding circuit 23. An example of a decoding circuit is shown in FIG. 10 and it will be appreciated that the decoding circuit 23 is substantially identical to the coding circuit 22. Thus, in the circuit of FIG. 10, the encoded data is fed to a clocked shift register of a pseudo random bit sequence generator 32'. The clocked shift register comprises a shift register 34' and further clocked bistables 36'. The encoded data is fed to the input of the shift register 34' and the output of the effective register, and an output tapped from the bistables 36' is fed to an exclusive OR gate 38'. The output of the gate 38', which is the random number generated by the pseudo random number generator 32' is fed to one input of an exclusive OR gate 30' to whose second input the encoded data is also fed. As will be clear from the description below, the random number generated by the pseudo random bit sequence generator 32' will be the same as that generated by the generator 32 of the coder of FIG. 9. It will therefore be appreciated that as the encoded data is an exclusive OR combination of the random numbers and the data, the output of the exclusive OR gate 30', which is combining the randomized data with the same random number, will be the original data.

Figure 12:
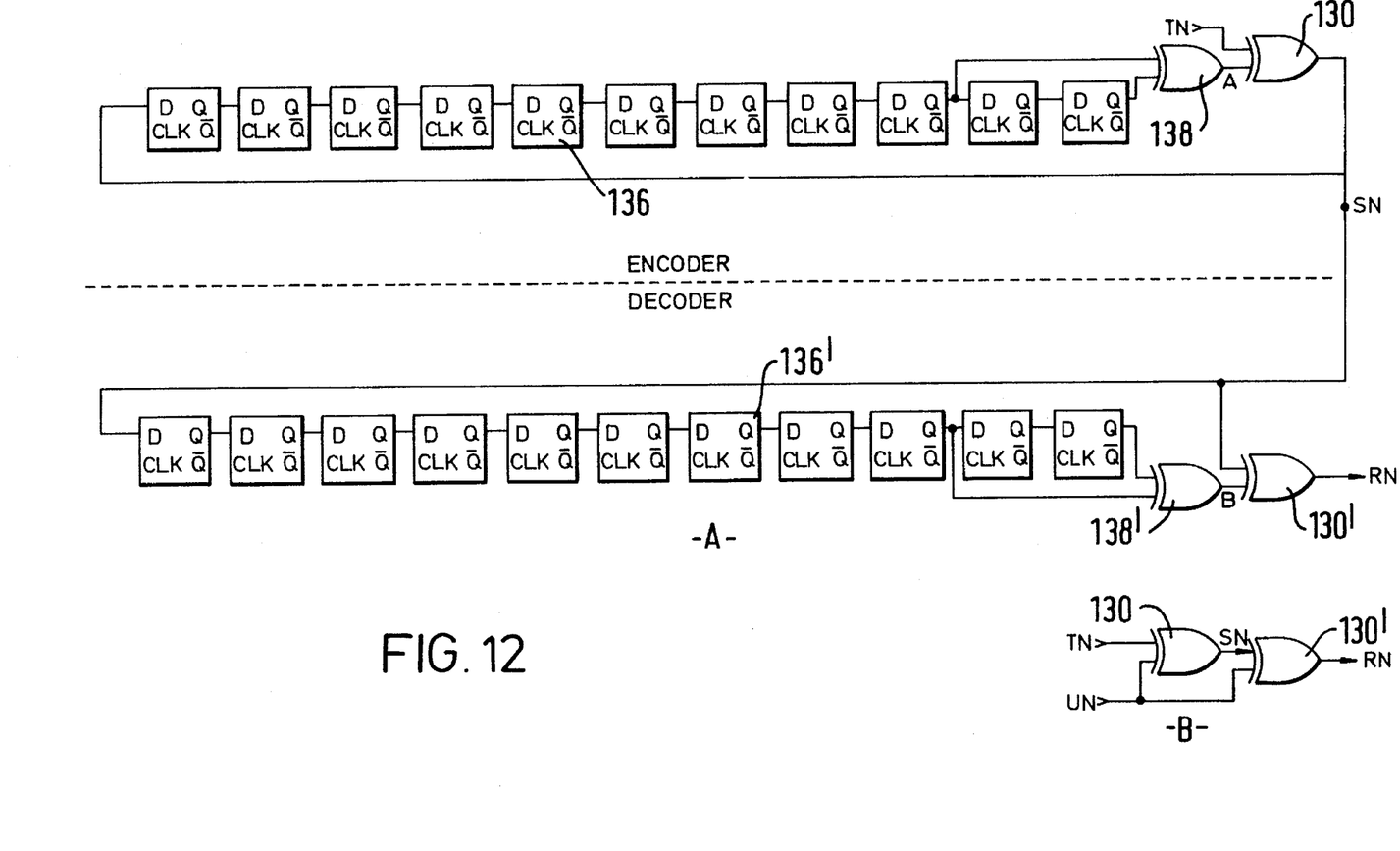

Because the numbers generated by the coder and the decoder are the same, there is no need to link the coder and the decoder in order to recover the original data. This process is illustrated by FIG. 12. FIG. 12A shows schematically the coder, in this figure the shift register is represented by a number of clocked gates 136. As in the circuit of FIG. 9, the output of an exclusive OR gate 130 is fed to the first stage of the clocked shift register, whereas the output of one stage thereof is tapped and fed to one input of a further exclusive OR gate 138. The other input of the gate 138 is the output of the shift register. An input TN to be encoded is fed to one input of the exclusive OR gate 130 to whose second input the output A of the exclusive OR gate 138 is fed.

The structure of the decoder is substantially identical to that of the coder. As shown, the decoder has a clocked shift register formed by a number of clocked gates 136' and an intermediate output is tapped by way of an exclusive OR gate 138' to whose second input the output of the shift register is applied. The output B of the gate 138' is fed to the exclusive OR gate 130'. The second input to the exclusive OR gate 130' is the output SN of the coder which is also fed to the first gate 136' of the clocked shift register of the decoder. The output RN of the decoder is the output of the exclusive OR gate 130'. In the schematic shown in FIG. 12 the clocked shift register of both the coder and of the decoder has 11 stages. Both the encoder and the decoder are synchronously clocked, and the output SN of the encoder is transmitted to the input of the decoder. It can be shown mathematically that after 11 clock cycles the two shift registers, of the coder and the decoder, will contain the same data so that the signals at A and B will be equal. At this time, the circuit shown in FIG. 12A can be reduced to the circuit shown in FIG. 12B comprised only of the interconnected exclusive OR gates 130 and 130'. The signal UN shown in FIG. 12B is the signal A or its identical signal B from FIG. 12A.

It will be appreciated from FIG. 12B that the two exclusive OR gates 130 and 130' will either both invert or will both not invert, depending upon the value of the input UN. This means that the signal RN which is output from the decoder will always be equal to TN which is input to the encoder, irrespective of the value of UN. That is, the output of the decoder will be the original data. It can be shown that this arrangement will work with any shift register length and with any tap position. However, it is necessary to choose the parameters such that when TN is 0, a maximal length sequence is produced.

It has been seen above that the data to be applied to the individual audio modules 10, which is produced as a regular data stream, is transmitted from the controller 12 to the first audio module 10 as a random sequence to avoid any crosstalk problems. The random sequence is decoded locally and then recoded for transmission to the next audio module. This means that the opportunity for interference from the regular data stream is seriously curtailed because the regular data stream only exists at the point of use.

Of course, and as discussed above, logic circuits require to be clocked, generally in synchronism, and regular clock pulses do, as illustrated graphically above, provide interference. Generally, because clock signals are well outside of the audio range, they are not considered to cause problems. However, clock signals can mix with other high frequency sources for example from a cassette recorder, and because of this in the embodiment of the present invention the clock signals are also randomized in the sense that it is ensured that they are not cyclic or repetitive.

In the embodiment of the invention, all of the logic circuits are arranged to be clocked on the receipt of a rising edge. In this respect, the clock pulses are altered to have a variable mark-space ratio. This means that the clock pulses arrive at random times and have random widths. They are therefore transmitted as randomized signals and, as described above, appear as white noise rather than as tones in the audio channel. Thus, away from the actual logic circuits using clock pulses, the clock signals appear to be randomized.

However, when a rising edge of the randomized clock signal arrives at logic circuits, all of the logic circuits react to the arrival of that rising edge. Furthermore, if the rising edges of randomized clock pulses are aligned with the rising edges of the original clock pulses, the necessary synchronism will be retained throughout the system.

Figure 14:
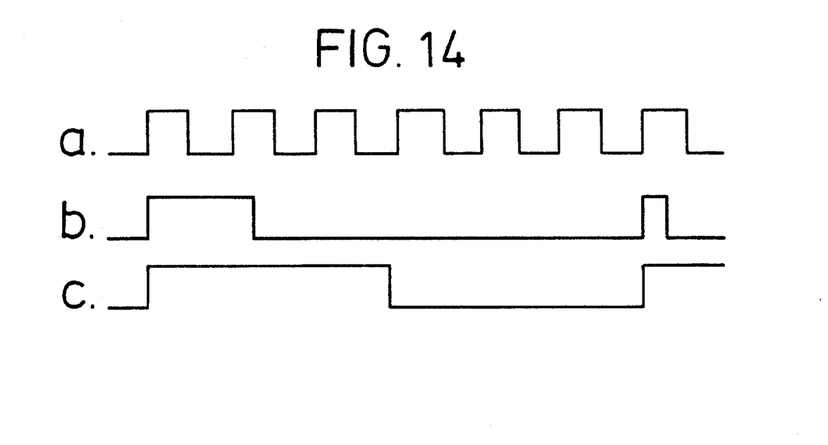

The randomization of a clock signal is illustrated in FIG. 14. In this respect, FIG. 14a shows a conventional regular pulsed clock signal, for example of 1 MHz. As illustrated, the clock signal is shown to have 7 rising edges. FIG. 14a shows a clock signal which is one seventh of the clock frequency of FIG. 14a, as is the signal of FIG. 14c. Both the clock signals of FIGS. 14b and 14c have rising edges which exactly coincide with the first and seventh pulses of the regular clock signal, and hence can trigger a logic circuit in synchronism therewith. However, the mark-space ratios of the signals 14b and 14c are very different and would appear, during transmission, to be random.

Figure 11:
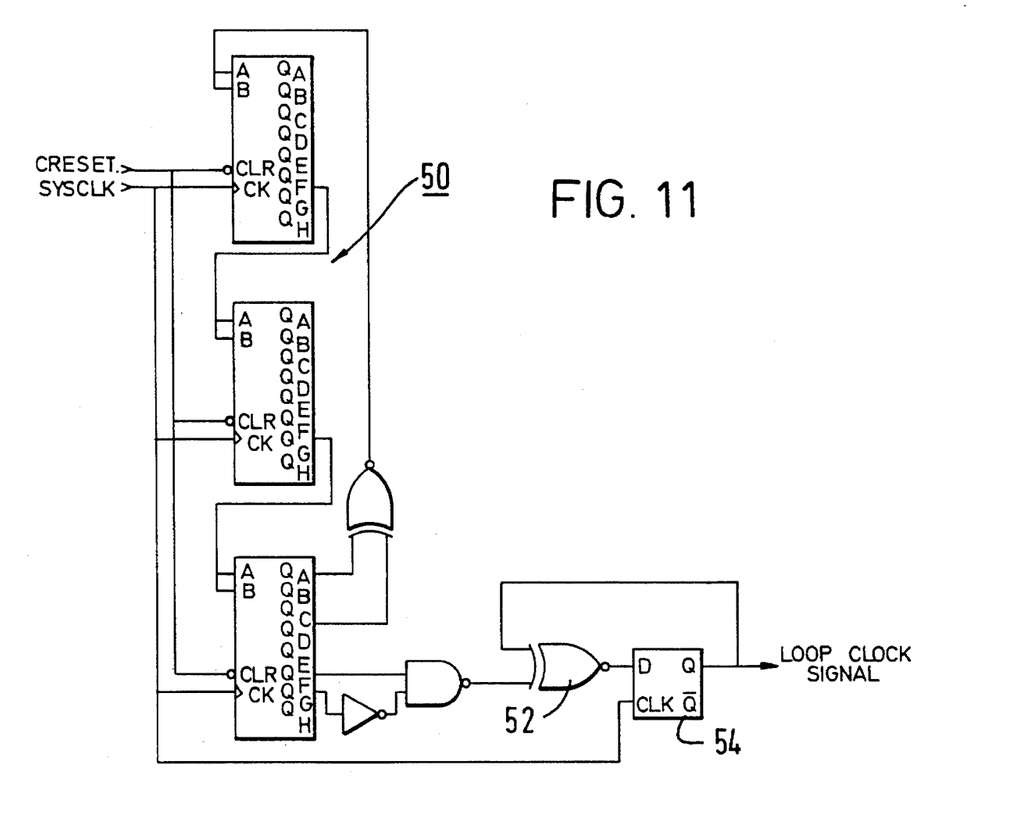
FIG. 11 shows an encoder for scrambling or randomizing clock signals, FIGS. 12, parts A and B, illustrates the coding and decoding of data bit signals.

A circuit for producing a random mark-space ratio divided from a regular clock signal is shown in FIG. 11. Again, the coding circuit of FIG. 11 is based on a clocked and tapped shift register arrangement generally indicated at 50 for Generating a random number. This random number is fed by way of an exclusive NOT OR gate 52 to a clocked bistable 54 whose output is the randomized clock signal applied to the serial loop. It will be appreciated that the other input to the bistable 54 is the system clock and that the output is fed back to the exclusive NOT OR gate 52. The generation of the randomized clock signal is generally by way of techniques similar to those described above with reference to the data encoding, and accordingly is not further described herein.

In the embodiment described and illustrated above, it will be seen that the serial loop is formed by providing two connectors 16 in each audio module 10 for connection respectively to the preceding and succeeding modules in the chain. An individual ribbon cable 14 is required to connect each pair of connectors. However, for manufacturing ease, it is preferred to have a single ribbon cable which runs along all of the modules and which is connected to each module 10 by a single connector. However, if, as is also preferred, each module has the same arrangement of output pins, such an arrangement would mean that all of the outputs of all of the modules would be connected together as would all of their inputs.

Figure 13:
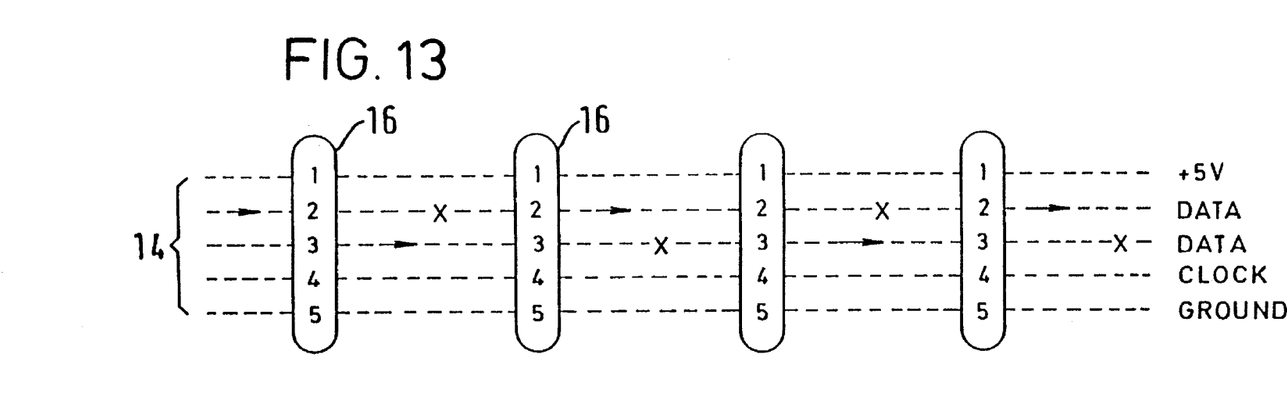
FIG. 13 shows schematically a further method for interconnecting audio modules of the analog system for form a serial loop, and FIG. 14, parts a, b and c, shows pulse diagrams illustrating the method of randomizing the clock signals.

FIG. 13 illustrates how a ring topology can be provided in these circumstances. In fact, the topology illustrated in FIG. 13 is not limited to the control of audio modules by a controller and can be utilised in any network where a ring is required and the nodes on the ring are identical.

FIG. 13 shows schematically a bus provided by the use of a ribbon cable 14. Five lines of the cable are indicated as lines 1 to 5 and, as illustrated line 1 will carry the power, line 4 will carry the clock, and line 5 will carry the ground. The lines are all connected to respective ones of the pins of a connector 16 pins. Each module, as 10 of FIG. 7, has a respective connector 16 which, and as indicated in FIG. 13, has 5 pins each of which is connected to a respective line of the ribbon cable 14. However, and as is indicated by a cross, open circuits are provided on the data carrying lines 2 and 3 at alternate positions. These open circuits may be provided by way of jig punching, for example. Arrow heads in FIG. 13 show the path for the transmission of serial data. Consideration of FIG. 13 will show that data flows into the first upstream connector on pin 2 but outputs the connector on pin 3. The data arriving at the next adjacent connector on pin 3 flows out of the connector on pin 2 and so on. With this arrangement it will be appreciated that the output of one module, for example on pin 3 of the respective connector, is not directly connected to the output of the next module, for example the output on pin 2 of the next connector because of the interposition of an open circuit.

The flow of data can be determined automatically. Thus, each of the pins 2 and 3 of each connector may automatically set to 'IN' on reset. Control logic can then be arranged, upon detecting arriving data on one pin, say on pin 2, to automatically set the other pin, say 3, to 'OUT'.

It will be appreciated that the invention has been described above by way of example only and, in particular, that other means may be employed for providing the random signals that are transmitted to the modules. Furthermore, although the invention has most particular application to audio systems, the techniques described can be utilised for the digital control of other analog systems.

Other variations and modifications to the particular embodiments described above may be made within the scope of this application.

I claim:

1. A method of controlling an analog audio system using digital control means, wherein said analog system comprises at least one audio component controlled by digital signals, and wherein said digital control means transmits the digital signals to each analog audio component to effect the control thereof, the method comprising the steps of scrambling the digital signals, transmitting the scrambled digital signals to at least one analog audio component, and at each said analog audio component receiving and unscrambling the scrambled digital signals for effecting control of the at least one analog audio component, wherein the step of scrambling the digital signals comprises rendering the digital signals uncyclic or unrepetitive by pseudorandomizing or scrambling said digital signals, and wherein the analog audio system comprises a number of analog audio components connected serially to form a serial loop, and wherein said method further comprises the step of transmitting scrambled digital signals undirectionally around the serial loop.

2. A method according to claim 1, wherein each said analog audio component is arranged to receive and unscramble transmitted scrambled digital signals, and wherein said each analog audio component is additionally arranged to scramble the digital signals and transmit said scrambled digital signals to a succeeding analog audio component.

3. A method according to claim 1, wherein the step of scrambling the digital signals comprises generating a pseudo random bit sequence from said digital signals.

4. A method according to claim 1, wherein the step of scrambling the digital signals comprises logically combining the digital signals with the output of a random number generator to provide a pseudo random bit sequence, and wherein the step of unscrambling the scrambled digital signals comprises logically combining the scrambled digital signals with the same pseudo random bit sequence.

5. A method according to claim 4, wherein the random number generator for scrambling the digital signals is a maximal length random number generator, and wherein a complementary maximal length random number generator is used for the unscrambling.

6. A method according to claim 1, wherein said digital signals comprise clock signals having a random mark-space ratio.

7. An analog system comprising at least one analog audio component, digital control means for generating digital signals for controlling said analog audio component, and coupling means coupling said digital control means to said analog audio component for transmitting said digital signals to said analog audio component, wherein encrypting means are provided for encrypting the digital signals for transmission to said audio component, wherein said analog audio component comprises decrypting means for decrypting the encrypted digital signals received for effecting control of the at least one analog audio component, and wherein said encrypting means pseudorandomize or scramble said digital signals whereby said encrypted digital signals are rendered uncyclic or unrepetitive, and wherein said analog system is a modular system formed of a plurality of serially coupled analog audio components, a first one of which is coupled to said digital control means, and a last one of which is also connected to said digital control means to define a serial loop.

8. An analog system according to claim 7, wherein each said analog audio component comprises a decrypting means for receiving encrypted digital signals from the digital control means or a preceding analog audio component, and each said analog audio component comprises an encrypting means for encrypting digital signals and transmitting them to a succeeding analog audio component or said control means.

9. An analog system according to claim 8, wherein the decrypting means of each said analog audio component is coupled by coupling means to a preceding analog audio component or to the control means, and the encrypting means of each said analog audio component is coupled to a succeeding analog audio component or to the control means.

10. An analog system according to claim 9, wherein the coupling means for coupling each said encrypting or decrypting means is provided by a bus.

11. An analog system according to claim 10, wherein said bus is arranged so that the output of one analog audio component is not directly connected to the output of a preceding or succeeding analog audio component.

12. An analog system according to claim 11, wherein each analog audio component is provided with at least one multi-pin connector, the connectors of all of the analog audio components being substantially identical, and wherein said bus is arranged to define a ring network and is coupled to each analog audio component by way of connectors, and wherein an open circuit is connected to an output pin of each said connector, the open circuit being connected to different output pins of adjacent connectors.

13. An analog system according to claim 12, wherein said bus is defined by a single ribbon cable.

14. An analog system according to claim 12 or 13, wherein one of the pins of the connector coupled to each analog audio component is dedicated as an input port, and another of the pins of said connector is dedicated as an output port, and wherein the connectors of adjacent components have different ones of their connector pins dedicated as input and output ports.

15. An audio component of an analog audio system, said audio component producing an analog audio output in response to encrypted digital control signals received by the analog audio component, wherein said audio component comprises a decrypting means for receiving and decrypting the digital control signals, sound producing circuits responsive to said decrypted digital control signals, and encrypting means for encrypting said digital control signals and applying said encrypted digital control signals to an analog audio output of the audio component.

16. An audio component according to claim 15, wherein the encrypting means of the or each said audio component comprises means for logically combining the digital control signals with a pseudo random bit sequence, and wherein the decrypting means of the or each said audio component comprises means for logically combining the encrypted digital control signals with a complementary pseudo random bit sequence.

17. An audio component according to claim 16, wherein each pseudo random bit sequence is generated by a pseudo random number generator.

18. An audio component according to claim 17, wherein each pseudo random number generator comprises a clocked shift register with a feedback circuit and a tapped output.

19. An audio component according to claim 17, wherein said pseudo random number generator is arranged to operate as a maximal length sequence.

* * * * *